United States Patent Office 3,190,408
Patented June 22, 1965

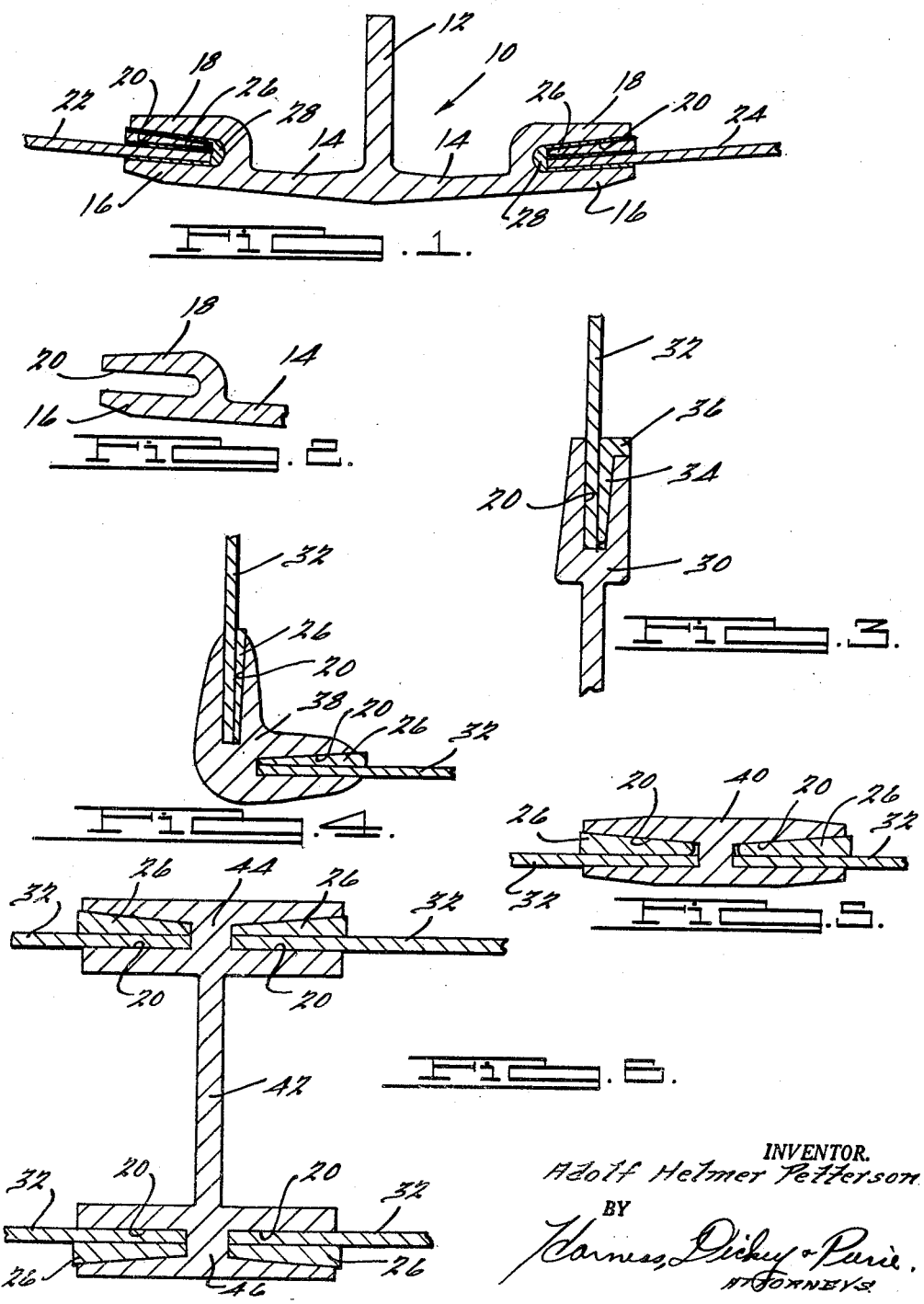

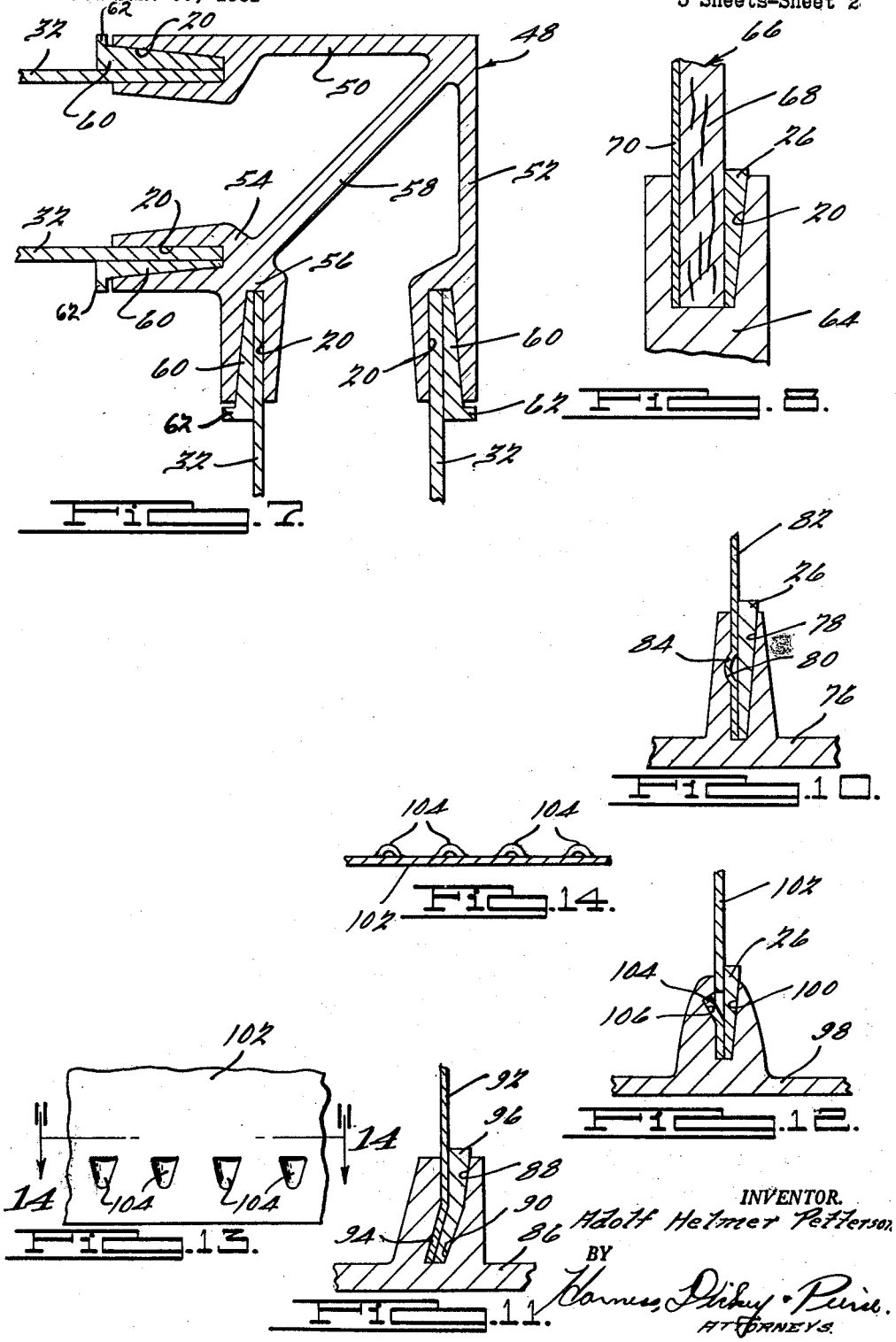

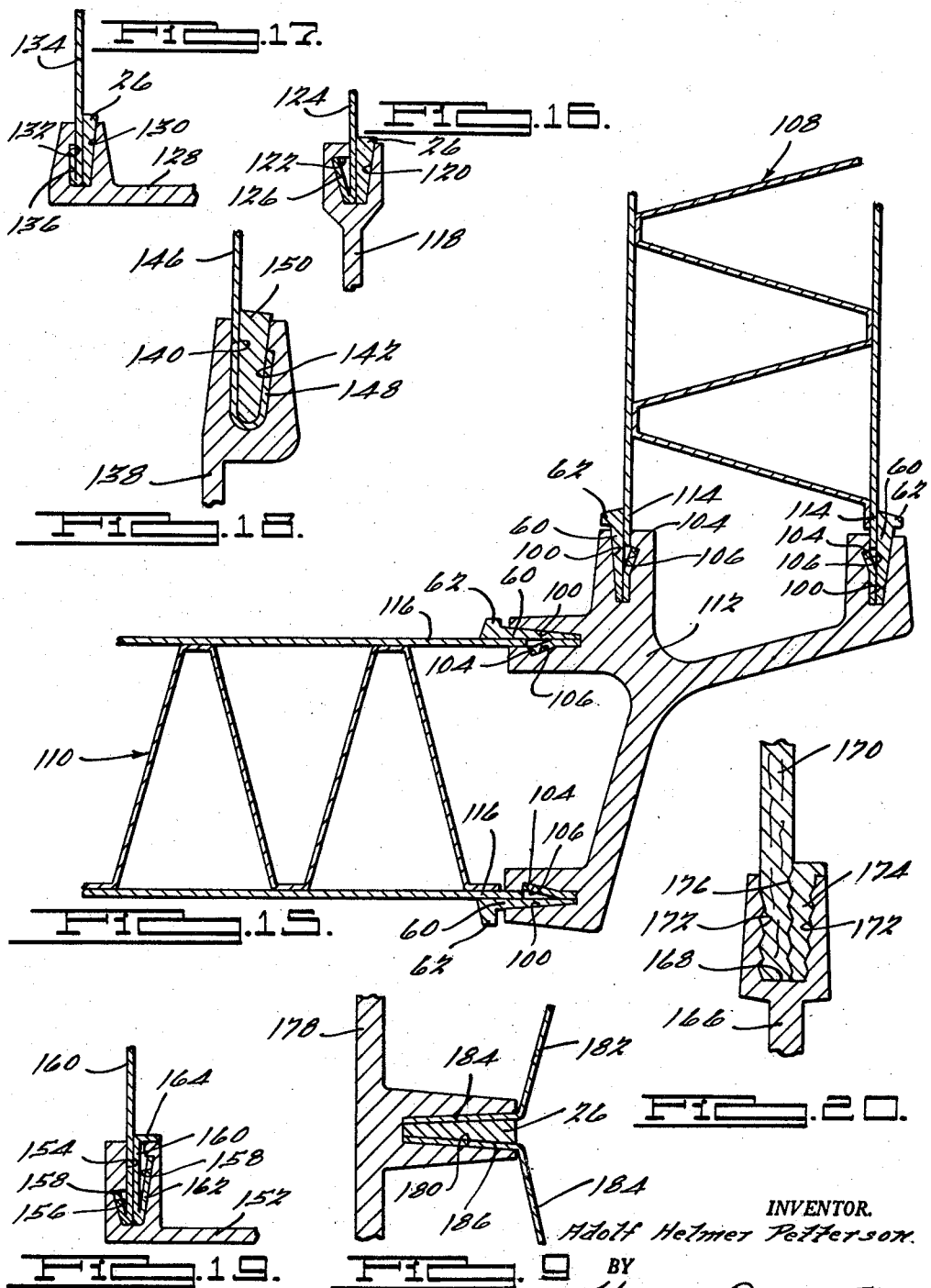

1

3,190,408
JOINING MEANS
Adolf Helmer Petterson, Goteborg, Sweden, assignor to Profile System International, Oslo, Norway
Filed Jan. 30, 1961, Ser. No. 85,906
Claims priority, application Sweden, Jan. 9, 1960, 170/60
7 Claims. (Cl. 189—36)

The present invention relates to means for joining a first member to at least one other member in an elongated continuous joint, this application being a continuation-in-part of my prior co-pending application Serial Number 78,681, filed December 27, 1960.

It is a primary object of the present invention to provide extremely simple, inexpensive, and novel means for joining together at least two members in an elongated continuous joint capable of withstanding high stresses as well as the leakage of fluid therethrough, which joint does not suffer any of the common disadvantages of conventional welded, riveted or bolted joints. A related object concerns the provision of such a joint wherein there is a uniformly distributed pressure along the entire length of the joint so that there are no point loads in any of the joined members.

A further object of this invention resides in the provision of a unique elongated continuous joint which may be conveniently and quickly effected between a first member having an elongated groove therein and a second member having an elongated portion receivable within said groove by an unskilled worker without the use of any special tools.

Yet another object of this invention concerns the provision of a number of grooved members, preferably extrusions, of unique design for joining together panels of sheet material and/or members provided with elongated flanges in a variety of arrangements, utilizing the joint of the present invention.

These and other objects of the present invention will become apparent from consideration of the present specification taken in conjunction with the accompanying drawings, in which there are shown several embodiments of the invention by way of example, and wherein:

FIGURE 1 is a cross-sectional view illustrating the keel of a small boat incorporating the principles of the present invention to reinforce and secure together the bottom panels of the boat;

FIGURE 2 is a fragmentary view of the keel structure shown in FIGURE 1 illustrating a portion of one of the joining means thereof with the bottom panel removed therefrom;

FIGURES 3 through 8 are cross-sectional views illustrating the basic joint of the present invention as it might be utilized in various applications;

FIGURE 9 is a cross-sectional view illustrating a modified form of the present invention for securing together and supporting a pair of panel members or flanges utilizing a single wedge-shaped member and a single groove;

FIGURES 10 through 12 and 15 through 18 are cross-sectional views of modified forms of the joint of the present invention wherein the non-grooved member of each joint is provided with additional locking means, FIGURE 13 being a side elevational view of one member of the joint shown in FIGURE 12, and FIGURE 14 being a sectional view taken along line 14—14 in FIGURE 13;

FIGURE 19 is a cross-sectional view illustrating a further modified form of the present invention wherein the wedge-shaped member is provided with additional locking means; and FIGURE 20 is a similar type view illustrating a modification wherein locking means are provided between the wedge-shaped member and the non-grooved member of the joint.

2

Broadly speaking, the underlying concept of the present invention resides in the provision of means for joining a first member to a second member in an elongated continuous joint, and comprises means on the first member defining an elongated groove therein, elongated means on the second member receivable within this groove, and an elongated wedge-shaped member adapted to be forced into the groove when the second member is positioned therein to tightly secure the latter in the groove, and thus to the first member. As will be more apparent hereinafter, these members to be joined may assume a variety of sizes and shapes for effecting joints for different applications, and in addition, may be so arranged that one of the members may be joined to a plurality of other members utilizing joining means incorporating the principles of the present invention. In any case, however, joints of this invention are elongated in nature, so that the depth or thickness of the joint is small relative to the length thereof, although the joint need not be perfectly straight in the longitudinal direction and could be curved. While none of the accompanying views illustrate the length of a joint, since such a view would reveal nothing, it is to be understood that the term "elongated" means of indefinite length, greater than the width and thickness of the joint, in a longitudinal direction perpendicular to the plane of the drawings. The basic joint of the present invention, as well as a number of combinable modifications thereof, will now be discussed in terms of structure suitable for a number of different applications.

Referring to FIGURE 1, there is shown an elongated keel member 10 which, through application of the principles of the present invention, is ideally suited for the manufacture of small boats. As can be seen, keel member 10, which may be formed, preferably extruded, from any suitable material, such as an aluminum alloy or the like, is symmetrical about a longitudinally extending vertical central plane and is provided with a vertically extending rib 12 to which may be secured suitable frames, bulkheads, or other ordinary reinforcing elements. Outwardly projecting in substantially opposite directions from the base of rib 12 are a pair of ribs or flanges 14, the outer ends of which are bifurcated to form lower and upper longitudinally extending elongated legs 16 and 18 respectively, defining therebetween longitudinally extending elongated grooves 20. Legs 16 may constitute extensions of flanges 14, and legs 18 may be arranged to extend upwardly and outwardly therefrom, as shown in FIGURE 1. Grooves 20 are preferably formed with parallel opposed sides, as shown in FIGURE 2, in which case the material of which keel member 10 is formed must be of a slightly resilient material, for reasons as will become apparent.

Portions of panel members to be joined together, which panel members would be the bottom plates of a boat in this application, are indicated at 22 and 24. Each panel member, which may be formed of any suitable material, such as an aluminum alloy or the like, is inserted loosely into one of the grooves 20, each of which is of a width greater than the thickness of the panel member it is adapted to receive. Each panel member is tightly secured within its associated groove by the forceable insertion into the groove of an elongated wedge-shaped member 26, in the manner illustrated. Since the opposed sides of the grooves are substantially parallel, as shown in FIGURE 2, legs 18 will be deflected away from the legs 16 when the wedge-shaped member is forced into place so that the stresses in the deflected legs will serve to clamp the panel members in place. Wedge angles in the order of 5 degrees have been found to give very satisfactory results with aluminum alloys, however for any given application and material the wedge angle which will cause the greatest amount of force to be asserted against the panel members should be used.

If desired, the strength and seal of the joint may be increased by coating the sides of grooves 20, the panels, and the wedge-shaped strips with a suitable adhesive, such as shown at 28. Thus, after the wedge-shaped strips have been forced into place, the adhesive will fill any irregularities in the cooperating surfaces of the joint to effect a good seal and a more permanent and stronger joint. Commercially available hardenable plastic type adhesives, such as the epoxy adhesives, have been found to be very effective. It should be noted, however, that the use of an adhesive is optional, since suitable joints having more than enough strength for most applications may be effected without the use thereof. In the event an adhesive is not used, the joint may be made completely fluid tight by the use of ordinary sealing or calking compounds. It has been found that in practice the simplest way to apply either adhesives or sealing compounds to a joint is to simply place a strip of the material in the bottom of the groove. When the wedge-shaped member is subsequently forced therein the material will be compressed to the point where it will flow between all the surfaces of the point to effectively secure and/or seal it.

As noted above, the cross-sectional shape of elongated groove 20 is generally rectangular, with substantially parallel opposed sides, when in the relaxed or unstressed state. This is the preferred groove shape for joints of the present invention, although it is not the only useable one, as will become more apparent hereinafter. With grooves of this shape, at least one side thereof should be deflected when the elongated wedge-shaped member is forced therein so that the resulting stresses in the deflected side may be utilized to create a uniformly distributed clamping force along the length of the joint to keep the joined members tightly secured together.

Considering, for exemplary purposes, application of the present invention to the manufacture of small boats, tremendous advantages may be realized using joints of the present invention. For example, an entire aluminum boat may be manufactured using nothing but several aluminum extrusions, for the keel, chines, and gunwales, having suitably located grooves therein, a plurality of pre-cut flat aluminum panels, and a plurality of wedge-shaped strips or members. The keel, chines, and gunwales would, of course, be prebent in the longitudinal direction to the final slightly curved shape desired, the front ends thereof being suitably beveled so as to accurately mate with each other and the rear ends shaped to fit the similarly constructed transom. To assemble a boat the flat pre-cut aluminum panels are loosely inserted into the appropriate grooves in the respective extruded members, the panels being bent by hand when necessary in order to insert them into the slightly curved portions of the grooves, such as near the bow of the boat. To insure that the craft will be water-tight, a strip of sealing material should be placed in the bottom of all the grooves before the panels are inserted therein. With the panel thus loosely inserted, an unskilled operator using nothing but a hammer may then force the wedge-shaped strips or members into the grooves into which the panel members have been placed. The job may be done quickly and efficiently and the resulting craft will be ready for use without further work being done to it.

Because of the ease of assembly, boats utilizing joints of the present invention are well suited to be sold in kit form for the relatively unskilled boat owner to assemble, no special tools being required. Alternately, manufacturers may ship boats in unassembled form to various small assembly plants throughout the country, avoiding the excessive freight costs which are involved when fully assembled boats are transported. As will be appreciated, since an entire boat in a collapsed state will consist of nothing more than a plurality of flat sheets, several slightly curved extrusions and a number of wedge-shaped strips, the resulting package will be extremely small and the shipping costs proportionately low. In addition, any desired surface treatment may be performed prior to assembly, which is simpler than treating an assembled boat. Since only a hammer is needed to assemble a boat of the aforementioned construction, such may be done out in the field where electricity or other forms of power are not readily available. Assembly is further made easy by virtue of the fact that no critical alignment or fitting problems exist since the various grooves are much wider than the thickness of the panels they are to receive.

All of these above described features, advantages, methods of assembly, and so on are fully applicable to any application where joints of the present invention are untilized, such as those described hereinafter. Various other applications and modifications of the present invention will now be described, like reference numerals being used to designate identical parts in the various embodiments.

In FIGURES 3 through 8 there are illustrated a number of embodiments of the basic joint shown in FIGURES 1 and 2. Thus, in FIGURE 3 there is shown an elongated supporting member 30 adapted to be joined to and support a panel member or flange 32. The upper end of support member 30 is bifurcated to form a pair of ribs defining a groove 20, such as described above, having substantially parallel opposed sides when relaxed. The joint is effected by first inserting the edge portion of panel member or flange 32 within groove 20 and then forcing into the groove an elongated wedge-shaped member 34 to tightly wedge panel or flange 32 in place. As will be observed, wedge-shaped member 34 may be provided with a shoulder portion 36 to serve both as a stop to prevent over-displacement of the wedge-shaped member into the groove when it is not to be bottomed in the groove, so as to prevent over-stressing the joint, and as ornamented means to give the joint neater appearance. It also facilitates to some extent the removal of the wedge-shaped member if desired. In FIGURES 4 and 5 there are illustrated elongated joining members 38 and 40, respectively, for joining together a pair of panel members or flanges 32, at right angles to each other in FIGURE 4 and coplaner in FIGURE 5. Each of the support members is provided with a pair of elongated grooves 20 of greater thickness than the panel members or flanges to be received thereby and having substantially parallel opposed sides when relaxed. Elongated wedge-shaped members 26, identical to those in FIGURE 1, are shown forced into grooves 20 to tightly secure the panel members or flanges to the joining members in the manner illustrated.

In FIGURE 6 there is shown an elongated reinforcing and joining member 42 for joining together two pairs of panel members or flanges 32. Each pair could be a panel of conventional sandwich construction, if desired. As can be seen, joining member 42 is generally I-shaped in cross-sectional configuration, the elongated flanges 44 and 46 thereof being substantially identical in shape to joining member 40, illustrated in FIGURE 5, including opposed elongated grooves 20 into which panel members or flanges 32 are tightly secured by means of elongated wedge-shaped members 26. In FIGURE 7 there is illustrated an elongated reinforcing and joining member 48 for joining together at right angles two pair of panel members or flanges 32, which again could be panels of ordinary sandwich construction. Joining member 48 comprises an elongated outer angular member having perpendicularly disposed legs 50 and 52, an elongated inner angular member having perpendicularly disposed legs 54 and 56, and a web 58 joining the outer apex of the inner angular member to the inner apex of the outer angular member so that the two angular members are disposed generally parallel to each other. Each of the four legs is bifurcated to define an elongated groove 20 at the free end thereof adapted to receive one of the panel members or flanges 32, each of which is tightly secured in place within a groove 20 by means of an elongated wedge-shaped member 60, of slightly different configuration than the above discussed wedge-shaped members. Each of the wedge-shaped members 60 is provided with a longitudinally and outwardly extending shoulder portion 62, so arranged that when the wedge-shaped member 60 fully bottoms within groove 20 the shoulder will be spaced slightly away from the groove. With such an arrangement it is thereby possible to easily remove a wedge-shaped member once it has been forced into position, such as would be necessary if one or more of the panels or flanges 32 became damaged and was to be replaced without replacing the entire structure. When an adhesive is used, of course, it is more difficult to remove the wedge-shaped member, however, by heating the joint it is usually possible to soften most adhesives sufficiently to effect the removal of the wedge-shaped member. Note that joining member 42 is so arranged that all of the wedge-shaped members are readily accessible for installation and removal.

In FIGURE 8 there is illustrated a basic joint according to the present invention wherein there is provided an elongated support member 64 having an elongated groove 20 therein of a width capable of receiving an overly thick panel member or flange 66, such as one of composite or bonded structure. For example, panel or flange 66 might comprise a layer of wood 68 having bonded thereto sheet metal 70. Panel 66 is tightly secured in place by means of an elongated wedge-shaped member 26 forced into groove 20.

In FIGURES 10 through 18 there are illustrated several other modified forms of the joint of the present invention, all of which are characterized by the fact that the non-grooved member of each joint is provided with additional locking means for further increasing the strength of the joint. As will be more apparent thereinafter, in all the modifications illustrated this locking means is in the form of some portion of the panel member or flange being crimped, deflected, or otherwise bent out of the plane of the remainder thereof, and a cooperating recess in the groove adapted to receive this projection. The result is a mechanical locking of the grooved member to the non-grooved member, in addition to the resilient clamping action.

In FIGURE 10 there is illustrated an elongated reinforcing or support member 76 having means thereon defining an elongated groove 78, one side of which is provided with an elongated longitudinally extending notch or recess 80. Groove 78 may be provided with substantially parallel opposed faces when in a relaxed condition. Adapted to be tightly secured within groove 78 is a panel member or flange 82 having a longitudinally extending elongated ridge portion 84 thereon adjacent the edge thereof and adapted to be received within recess 80 when the panel member or flange is positioned within groove 78. When so positioned, a permanent joint is effected by forcing into the groove an elongated wedge-shaped member 26. As will be observed, ridge portion 84 projects from panel member or flange 82 a distance less than the width of groove 78, so that no interference is encountered when the panel member or flange is inserted within the groove.

In FIGURE 11 there is illustrated an elongated reinforcing or supporting member 86 having means thereon defining an elongated substantially parallel sided groove 88, when relaxed. As can be seen, the sides of groove 88 do not lie in single planes, but are offset in one direction towards the bottom thereof, as at 90. The panel member or flange, generally indicated at 92, adapted to be securely held within groove 88, is provided with an offset portion 94 longitudinally extending along the edge thereof which is to be positioned within the groove, offset portion 94 being adapted to mate with one side of the offset portion 90 of groove 88 in the manner illustrated. The joint is secured by a similarly offset elongated wedge- shaped member 96 which is forced into the groove to secure panel member or flange 92 tightly therein.

A further and very important modification of the present joint is illustrated in FIGURES 12 through 14. In this modification, the joint is effected between an elongated reinforcing or supporting member 98 having an elongated groove 100 therein, and a panel member or flange 102, by means of the forcible insertion into groove 100 of an elongated wedge-shaped member 26. The locking means of the present modification is in the form of a plurality of punched-out projections 104 disposed in a row adjacent the edge portion of the panel member or flange adapted to be inserted into groove 100. As can be seen, all of the projections 104 are aligned in a row substantially parallel to the adjacent edge of the panel or flange, with the inside projecting edges thereof lying substantially along a straight line. To receive these projections in a locking relationship one side of groove 100 is provided with a longitudinally extending elongated recess 106. The projections 104 may be easily formed by means of a conventional roll punch, and the distance they project outwardly from the panel member or flange should be less than the width of slot 100, so that the panel or flange may be easily inserted into the groove without interference, whereupon the elongated wedge-shaped member may be forced into place. If desired, this joint may be modified by providing sharper projections on the panel or flange and forming the grooved member of a much softer material so that a self locking action may be achieved without providing the groove with a recess.

Another practical application of the joint just described is illustrated in FIGURE 15, wherein two panels 108 and 110 of sandwich construction are reinforced and joined together by an elongated joining member 112. As can be seen, joining member 112 is of a distorted generally X-shaped configuration arranged to define two pairs of generally parallel disposed longitudinally extending grooves 100, each having a longitudinally extending recess 106 therein. Panel 108 is provided with a pair of longitudinally extending flanges 114 adapted to be inserted within one pair of grooves 100. Each of the flanges 114 is provided with a longitudinally extending row of projections 104 adapted to lockingly engage longitudinally extending recesses 106. Flanges 114 are sufficiently flexible that they may be slightly deflected apart by the camming action of projections 104 when they are inserted into a pair of grooves 100. Once in place, an elongated wedge-shaped member 60, such as described above, is forced into each of the grooves from the accessible sides of the panel to secure the assembly in the manner illustrated. Similarly, panel 110 is provided with a pair of flanges 116, both of which are also provided with a longitudinally extending row of projections 104 adapted to be lockingly received within longitudinally extending recesses 106 in grooves 100. Panel 110 is rigidly secured in place by means of a pair of elongated wedge-shaped members 60 in the same manner as in panel 108 The wedge-shaped members 60 are provided with longitudinally extending shoulders 62 which may be engaged by a suitable tool to remove them when desired, such as when either of the panels should become damaged and need to be replaced.

In FIGURES 16 through 18 there are illustrated several further forms of the present invention wherein the locking means on the panel member or flange is in the form of a crimped or reversely bent edge portion which is adapted to lockingly engage a longitudinally extending recess within the groove. Thus, in FIGURE 16 there is shown an elongated first member 118 having a longitudinally extending groove 120 therein, one side of which is provided with a longitudinally extending recess 122. Groove 120 is adapted to receive a panel member or flange 124 having a reversely bent or crimped edge portion 126, the latter being adapted to be received within recess 122 when the panel or flange 124 is inserted into groove 120 as illustrated. The joint is tightly secured by forcing into the groove an elongated wedge-shaped member 26, such as described above. As will be noted, the crimped portion 126 of panel or flange 124 extends outwardly therefrom a distance less than the width of the groove 120 so that the former may be inserted into the groove without interference. While such is the contemplated construction, if desired, panel member or flange 124 may be formed of some relatively resilient material with the crimped portion 126 formed outwardly therefrom a distance greater than the width of the groove, so that a snapping or spring locking action will occur when the panel or flange is inserted into the groove. The joint illustrated in FIGURE 17 is essentially the same as the one shown in FIGURE 16, comprising an elongated reinforcing or supporting member 128, means thereon defining an elongated or longitudinally extending groove 130 having a longitudinally extending recess 132 therein, a panel member or flange 134 having along one edge thereof a reversely crimped portion 136 inserted within groove 130, the crimped portion 136 lockingly engaging recess 132, and a longitudinally extending wedge-shaped member 26 firmly wedged into position in groove 132 to tightly secure the joint. This joint differs from the joint in FIGURE 16 only in the shape of the supporting member 128, and the degree to which crimped portion 136 is reversely bent.

A slightly modified form of the joint illustrated in FIGURES 16 and 17 is illustrated in FIGURE 18. In this latter joint there is provided an elongated joining or supporting member 138 having means thereon defining a longitudinally extending groove 140, one side of which is provided with a longitudinally extending recess 142. Groove 140 is adapted to receive a panel member or flange 146 having a gradually rounded reversely bent crimped portion 148 along the edge thereof adapted to be joined. To form this joint, the panel or flange 146 is snapped into place within groove 140, so that the reversely bent crimped portion 148 lockingly engages recess 142, and then an appropriately shaped elongated wedge-shaped member 150 is forced into groove 140 between the panel or flange 146 and the reversely bent portion 148, as clearly illustrated. The cross-sectional shape of wedge-shaped member 150 corresponds to the interior shape of panel or flange 146 when positioned within groove 140.

In FIGURE 19 there is illustrated a form of the present invention wherein the elongated wedge-shaped member is provided with locking means, rather than the panel or flange member, as in the immediately preceding forms. Thus, there is shown an elongated supporting or joining member 152 having means thereon defining an elongated or longitudinally extending groove 154, one side of which is provided with a recess 156 and the other side of which is provided with a recess 158. Recess 156 is adapted to receive in locking relationship crimped portion 158 of a panel member or flange 160, in a manner identical to that shown in FIGURE 16. The novelty in this joint, compared to the preceding joints, lies in the fact that the elongated wedge-shaped member, generally indicated at 160 here, is formed from sheet spring metal or like material, and comprises a reversely bent crimped portion 162 adapted to lockingly engage recess 158 and a transversely extending flange portion 164 which may be used to force and thereby snap the elongated wedge-shaped member 160 into the groove 154 to tightly lock the joint in a manner illustrated. As will be appreciated, the novelty of this joint lies in the construction of the wedge-shaped member, and any type panel member or flange may be used in conjunction with it.

In FIGURE 20 there is illustrated a further modification of the present invention, wherein locking means are provided between the panel or flange member and the elongated wedge-shaped member. Such a joint might be useful when it is desired to join to an elongated reinforcing or supporting member 166, having a longitudinally extending groove 168 therein, a panel member or flange 170 formed of some relatively soft material, such as wood or the like. In such an arrangement the sides of groove 168 may be provided with a plurality of longitudinally extending ridges 172 which can be used in conjunction with an elongated wedge-shaped member 174 having longitudinally extending ridges 176 on each side thereof. The panel member or flange 170 is originally without longitudinally extending ridges, however, when it is inserted into groove 168 and locked into place by forcing into the groove wedge-shaped member 174, the transverse forces created will cause the material of panel or flange 170 to conform to the shape of opposed ridged surfaces 172 and 176, on one side of the groove and the wedge-shaped member respectively. As will be appreciated, the pitch, depth and general shaped of the ridges may be varied, depending upon the particular materials used in the joint, and it is not necessary that all the various ridged surfaces be the same, with the exception that the outside face of the wedge-shaped member should mate with the corresponding face or side of groove 168.

In FIGURE 9 there is illustrated yet another embodiment of the present invention, wherein a single elongated wedge-shaped member and a single elongated groove are utilized to secure together two panel members or flanges. Thus, there is provided an elongated reinforcing or support member 178 having means thereon defining an elongated groove 180. Two members 182 and 184 are joined together to support member 178 by means of an elongated flange 184 on member 182 and an elongated flange 186 on member 184. Flanges 184 and 186 are inserted within groove 180 and then firmly secured in place by the forceable insertion into the groove, between these flange members, of an elongated wedge-shaped member 26, such as described above. As will be appreciated, members 182 and 184 may be of any shape, so long as their flanges are adapted to be received together within groove 180. Furthermore, this joint is readily adapted to any of the locking arrangements discussed above. The joint of FIGURE 9 may be slightly modified, if desired, for joining a single panel member to a support member. In such an arrangement, members 182 and 184 would be formed of a single sheet of somewhat flexible material, joined together at the terminal ends of flanges 184 and 186 at the bottom of groove 180 in a manner which may be readily visualized.

While the above list of modifications of the joint of the present invention is long, it is by no means all inclusive since possible applications of the present joint are practically unlimited in number. Since the present joint is particularly suited to applications utilizing extruded shapes for the grooved member, and since any given open shape is just as easy and inexpensive to extrude as any other open shape, practically any arrangement of grooves, recesses, and so on may be readily formed for any particular application. In any case, however, joints of the present invention are elongated in nature, having a continuous uninterrupted joining action throughout the length thereof. As will be appreciated, any shape or size members can be joined according to the principles of the present invention, so long as one of the members is provided with flexible ribs defining an elongated groove of sufficient width to receive the flange. In the present specification, the edge portion of a panel of sheet material to be joined is considered to be a "flange" even though it may not be distinguishable from the rest of the panel. In the various forms of the invention illustrated and described, there are shown seven different arrangements, each characterized by a single basic feature. Broadly speaking, the seven basic arrangements deal with the cross-sectional shape of the groove, the provision of an adhesive or sealing compound, the provision of locking means on the non-grooved panel member or flange, the provision of locking means on the wedge-shaped member, the provision of locking means between the panel member or flange and the wedge-shaped member, the provision of a shoulder on the wedge-shaped member, and an arrangement whereby two panels or flanges may be joined using one wedge and one groove. It is important to note that these various arrangements are not mutually exclusive, and that they may be readily combined with one another in any given joint. For example, any of the joints disclosed herein may be provided with adhesive or sealing compound, or with locking means on the panel or flange, or with locking means on the wedge-shaped member, and so on. In any given application the particular wedge angle utilized will depend upon the specific materials being joined, and should be such that maximum forces will be obtained, as will be determinable by one skilled in the art having knowledge of the principles of the present invention.

Thus, there are disclosed in the above description and in the drawings a number of exemplary embodiments of the present invention which fully and effectively accomplish the objects thereof, and which are readily adaptable for use in a great number of applications, such as, for example the manufacture of small boats, in both collapsed and finished form, the manufacture of house and truck trailers, and reuseable shipping containers, and generally in industrial construction applications, including buildings and swimming pools, and so on. However, it will be apparent that variations in the details of construction may be indulged in without departing from the sphere of the invention as herein described or the scope of the appended claims.

What is claimed is:

1. Means connecting a panel member to an elongated member, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another and each of said rib means tapering in cross-section away from said elongated member, said rib means receiving a portion of the panel member therebetween and being spaced apart a distance greater than the thickness of said portion of the panel member, and elongated wedge means having a wedge-shaped cross section inserted between said rib means, small thickness edge first, when said portion of the panel member is disposed therebetween, the outside cross-sectional configuration of said wedge means being sufficient when thus inserted to cause a resilient bending of said rib means away from one another whereby the panel member will be clamped therebetween primarily by the resilient bending stresses in said rib means.

2. Means connecting a panel member to an elongated member, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another, the width of each of said rib means being substantially the same, said rib means receiving a portion of the panel member therebetween and being spaced apart a distance greater than the thickness of said portion of the panel member, and elongated wedge means having a wedge-shaped cross section inserted between said rib means, small thickness edge first, when said portion of the panel member is disposed therebetween, the outside cross-sectional configuration of said wedge means being sufficient when thus inserted to cause a resilient bending of said rib means away from one another whereby the panel member will be clamped therebetween primarily by the resilient bending stresses in said rib means.

3. Means connecting a panel member to an elongated member, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of an aluminum alloy and having a materially greater width than thickness to permit a resilient bending of said rib means with respect to one another, said rib means receiving a portion of the panel member therebetween and being spaced apart a distance greater than the thickness of said portion of the panel member, and elongated wedge means having a wedge-shaped cross section inserted between said rib means, small thickness edge first, when said portion of the panel member is disposed therebetween, said wedge means being formed of an aluminum alloy and having an outside cross-sectional configuration defining an included angle of approximately 5° so that when thus inserted it causes a resilient bending of said rib means away from one another whereby the panel member will be clamped therebetween primarily by the resilient bending stresses in said rib means.

4. Means connecting a panel member to an elongated member, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another, said rib means receiving a portion of the panel member therebetween and being spaced apart a distance greater than the thickness of said portion of the panel member, and elongated wedge means having a wedge-shaped cross section inserted between said rib means, small thickness edge first, when said portion of the panel member is disposed therebetween, the outside cross-sectional configuration of said wedge means being sufficient when thus inserted to cause a resilient bending of said rib means away from one another whereby the panel member will be clamped therebetween primarily by the resilient bending stresses in said rib means, said wedge means having an elongated flange along one edge thereof defining a transversely extending shoulder everlying the free edge of the adjacent rib means.

5. Means connecting a panel member to an elongated member, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another, said rib means receiving a portion of the panel member therebetween and being spaced apart a distance greater than the thickness of said portion of the panel member, and elongated wedge means having a wedge-shaped cross section inserted between said rib means, small thickness edge first, when said portion of the panel member is disposed therebetween, the outside cross-sectional configuration of said wedge means being sufficient when thus inserted to cause a resilient bending of said rib means away from one another whereby the panel member will be clamped therebetween primarily by the resilient bending stresses in said rib means, said wedge means having an elongated flange along one edge thereof defining a transversely extending shoulder overlying the free edge of the adjacent rib means, said shoulder being spaced from said free edge when said wedge means is fully inserted.

6. Means connecting an elongated member to the edge portion of a panel member which is of uniform thickness and lacks any projections, ribs, flanges, holes or the like, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another, said rib means receiving the edge portion of the panel member therebetween and being spaced apart a distance greater than the thickness of said portion of the panel member, and elongated wedge means having a wedge-shaped cross section inserted, small thickness edge first, between said first surface and said portion of the panel member when the latter is disposed between said rib means, the outside cross-sectional configuration of said wedge means being sufficient when thus inserted to cause a resilient bending of said rib means away from one another whereby the panel member will be clamped therebetween primarily by the resilient bending stresses in said rib means, the entire portion of said second surface which engages the edge portion of the panel being flat in a transverse direction.

7. Means connecting a panel member to an elongated member, said elongated member comprising first elongated rib means formed integrally therewith and having a first surface on one side thereof, second elongated rib means formed integrally with said elongated member disposed substantially parallel to said first rib means, a second surface on said second rib means in facing relationship to said first surface on said first rib means and generally parallel thereto when said rib means are unstressed, each of said rib means being formed of resiliently deflectable metal and having a materially greater width than thickness to permit a resilient bending of said rib means with respect to one another, said rib means receiving a portion of the panel member therebetween and being spaced apart a distance greater than the thickness of said portion of the panel member, elongated wedge means having a wedge-shaped cross section inserted between said rib means, small thickness edge first, when said portion of the panel member is disposed therebetween, the outside cross-sectional configuration of said wedge means being sufficient when thus inserted to cause a resilient bending of said rib means away from one another whereby the panel member will be clamped therebetween primarily by the resilient bending stresses in said rib means, and a layer of adhesive on opposite faces of said panel portion.

References Cited by the Examiner
UNITED STATES PATENTS

| | | | |
|---|---|---|---|
| 569,235 | 10/96 | Rockwell | 20—92 |
| 647,872 | 4/00 | Pease | 20—92.7 |
| 1,297,591 | 3/19 | Prescott | 189—36 |
| 2,010,848 | 8/35 | Dix | 189—34 |
| 2,877,874 | 3/59 | Meyer | 189—34 |
| 2,887,877 | 3/59 | Davis | 50—214 |
| 2,909,253 | 10/59 | Hinze | 189—37 |

RICHARD W. COOKE, JR., *Primary Examiner.*
CORNELIUS D. ANGEL, *Examiner.*